United States Patent [19]
Chill et al.

[11] 3,927,957
[45] Dec. 23, 1975

[54] APPARATUS FOR MAKING YARN FROM POLYMER FILM

[75] Inventors: Leonard Chill, Waynesboro, Va.; Gordon B. Johnson, Sausalito; Carl S. Weisner, Pleasant Hill, both of Calif.

[73] Assignee: Chevron Research Company, San Francisco, Calif.

[22] Filed: Feb. 11, 1974

[21] Appl. No.: 441,700

Related U.S. Application Data

[62] Division of Ser. No. 317,502, Dec. 21, 1972, Pat. No. 3,807,918.

[52] U.S. Cl. .............. 425/131.1; 425/316; 425/445; 425/455
[51] Int. Cl.² ..... B29D 7/02; B29D 7/20; B29F 3/12
[58] Field of Search .......... 425/131, 315, 316, 445, 425/455, 131.1; 264/147, DIG. 47

[56] References Cited
UNITED STATES PATENTS

| | | | |
|---|---|---|---|
| 1,730,673 | 10/1929 | Mell | 425/505 X |
| 2,709,834 | 6/1955 | Johnson | 425/462 |
| 3,492,389 | 1/1970 | Port et al. | 264/147 |
| 3,496,259 | 2/1970 | Guenther | 264/156 |
| 3,582,418 | 6/1971 | Delft | 264/DIG. 47 |
| 3,639,573 | 2/1972 | Port | 264/DIG. 47 |

Primary Examiner—R. Spencer Annear
Attorney, Agent, or Firm—J. A. Buchanan, Jr.; Dix A. Newell; S. Russell LaPaglia

[57] ABSTRACT

A process and apparatus is disclosed for preparing Moresque (multicolored) yarn from thermoplastic polymers. An elongated flat die is utilized to extrude parallel streams of molten polymers of alternating colors onto a casting roll to form a thermoplastic polymer film. Desired color combinations can be obtained by preselecting the colors of the molten polymer streams. The congealed film is oriented in the longitudinal direction to increase the longitudinal strength. The stretched film is cut in strips of uniform width by means of a cutting tool with a series of cutting heads. In order to obtain a random color distribution on the edges of individual strips, the film is oscillated across the direction of the longitudinal axis prior to cutting. These strips are fibrillated to produce a fibrous network which upon twisting simulates natural yarns suitable for indoor-outdoor carpets or general commercial textile use.

2 Claims, 8 Drawing Figures

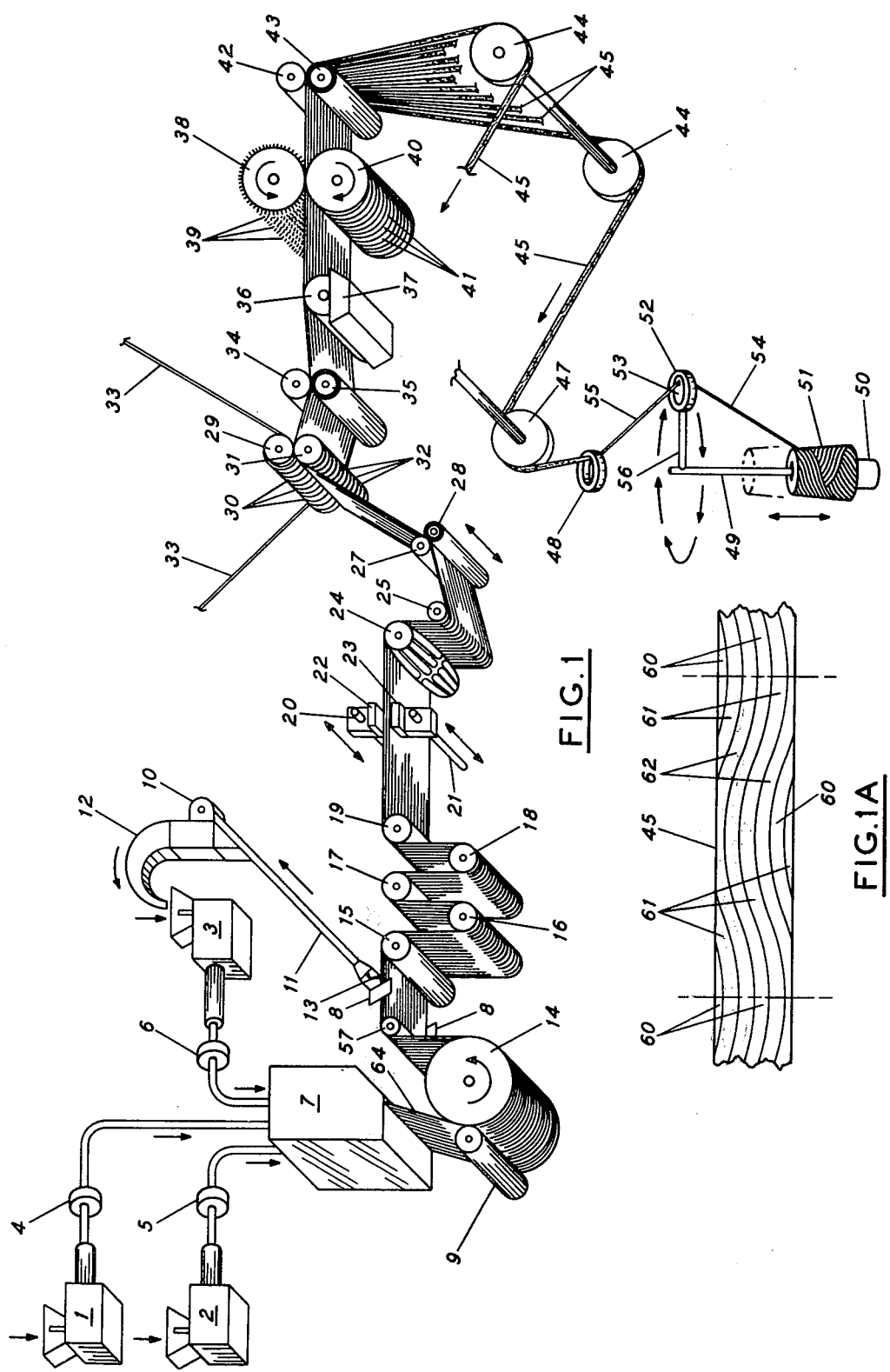

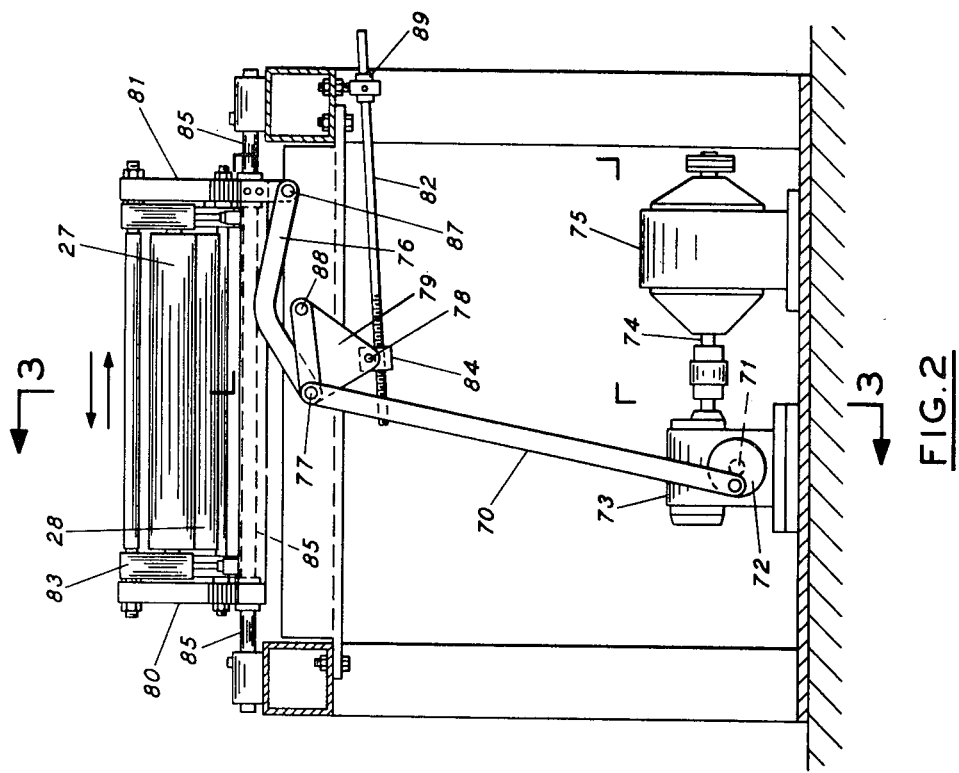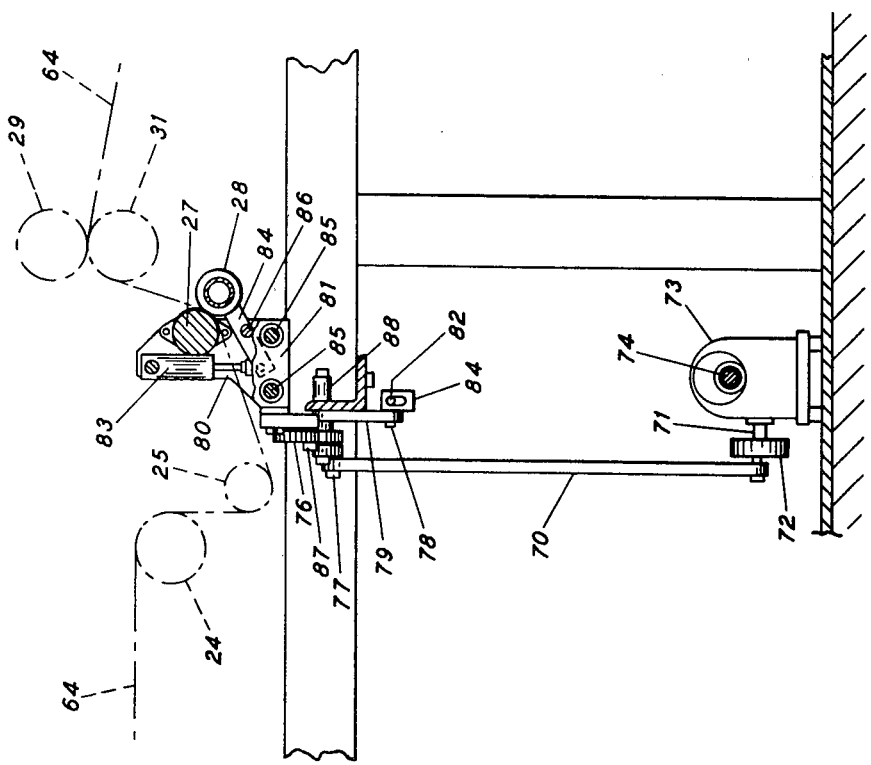

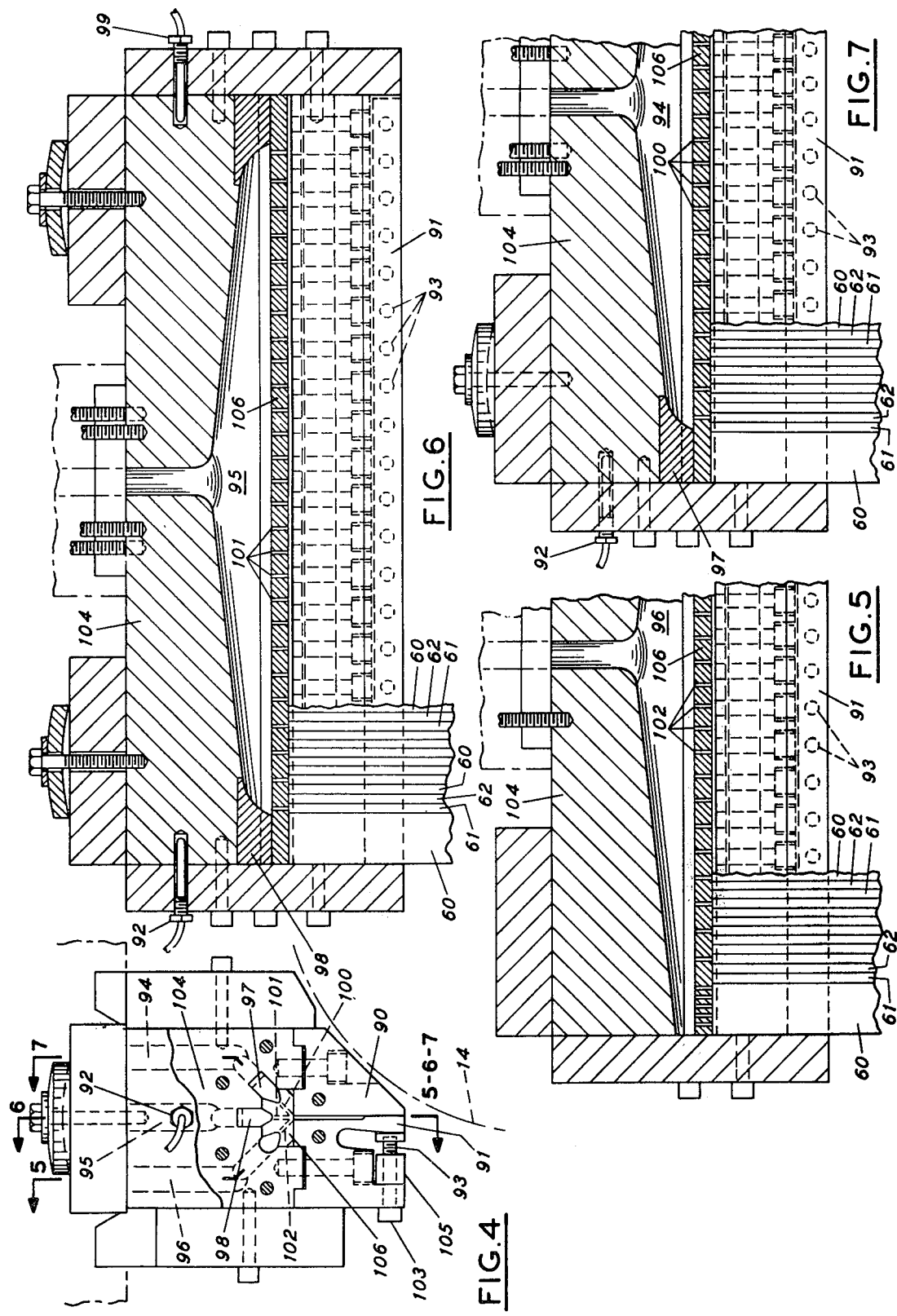

APPARATUS FOR MAKING YARN FROM POLYMER FILM

This is a division of application Ser. No. 317,502, filed Dec. 21, 1972, now U.S. Pat. No. 3,807,918, issued Apr. 30, 1974.

FIELD OF INVENTION

This invention is directed to a process and apparatus for producing Moresque (multicolored) yarn and, more particularly, to a process and apparatus for continuously producing Moresque yarn from extruded multicolored thermoplastic polymer film.

BACKGROUND OF THE INVENTION

Yarn has traditionally been produced by separating or carding natural fibers and then twisting several strands together. Recently, synthetic fibers have been made by extruding molten polymer through spinerettes to form fine threads or strands which are then twisted to make yarn. A more recent development has been the use of sheets of polymer film as raw material for producing thin strips which are fibrillated and twisted to make yarn. Several patents have been obtained on processes for fibrillating polymer film. See, e.g., U.S. Pat. Nos. 3,491,928, 3,496,259, 3,496,260, and 3,511,901. The existing art in the polymer film-to-yarn field, however, does not encompass the production of Moresque yarn from a single multicolored polymer film.

Moresque yarn is normally made by twisting together individual strands or bundles of differently colored yarn. Natural fiber yarn and synthetic yarn, including yarn produced from polymer films, can be used to produce Moresque yarn in this manner. Moresque yarn is used to produce aesthetically appealing carpets or upholstery or other woven or tufted products. Moresque yarn is especially desirable because objects made from it have a greater facility for concealing soils and stains than objects made from solid color yarn. Moresque yarn made from thermoplastic polymer film is especially suitable for heavy duty uses such as indoor-outdoor carpets or so-called contract carpets (schools, offices, etc.) because of their high wear resistance and case of cleaning. Polymer stability (resistance to deterioration) can be obtained by the inclusion of chemical inhibitors.

A long standing problem in producing Moresque yarn has been the difficulty in twisting yarns together in a uniform manner so that the finished product has a uniform appearance. Also, the colors of individual yarn lots would often vary so that a constant color mix could not be obtained. Conventional Moresque yarn is more costly to produce than solid colored yarn because it required additional processing which had a high rejection rate due to uneven twisting.

It is, therefore, an object of this invention to produce Moresque yarn from a continuous thermoplastic polymer film without the necessity of twisting differently colored strands of yarn together.

It is also an object of this invention to produce Moresque yarn with a highly uniform appearance.

BRIEF DESCRIPTION OF INVENTION

The present invention comprises a continuous process for producing Moresque yarn from thermoplastic polymer film. Thermoplastic polymers of different colors which form films on extrusion are introduced at high temperature and pressure to a die from which they are extruded as film. The die has a separate conduit and a series of outlets for each color so that the extruded film exhibits the different colors in alternating sequence. The polymer film is then oriented in the longitudinal direction from 5 times its original length up to the point at which incipient fibrillation occurs to increase longitudinal stress strength. The draw ratio is chosen to provide a finished product with suitable denier and texture. The film is then cut in strips of uniform width along the direction of the longitudinal axis. In order to achieve a random coloring along the edges of these strips (the edges of the strips having a significant effect on the appearance of the yarn), the film is oscillated across the direction of the longitudinal axis prior to cutting. The amplitude and frequency of the oscillation may be varied to better the appearance of the finished product. After cutting, the strips of film are fibrillated to produce a fibrous network which upon twisting simulates the structure of natural fiber yarn. Yarns formed in this way appear to be a uniform mixture of several colors.

The process of the present invention can be applied to any film-forming thermoplastic polymer. Thermoplastic polymers, which are capable of forming films on extrusion, are amenable to subsequent longitudinal orientation and fibrillation. Examples of suitable thermoplastic polymers are polypropylene, nylon, polyesters, vinyl chloride, and polyethylene. Polypropylene is the preferred raw material for the continuous production of Moresque yarn.

BRIEF DESCRIPTION OF THE DRAWINGS

A more complete understanding of the process and apparatus of the present invention can be obtained by reference to the accompanying drawings which are hereby incorporated into this specification and in which:

FIG. 1 is a schematic diagram illustrating the steps of the process for making Moresque yarn from thermoplastic polymer film. The steps shown include melting the thermoplastic polymer, extruding the thermoplastic polymer film, orienting the thermoplastic polymer film, oscillating the film, cutting the film into uniform strips, fibrillating the strips, twisting the strips and collecting the yarn.

FIG. 1A is a magnified view of an individual strip of film, illustrating the color alteration along the edge which is obtained by oscillation.

FIG. 2 is an end view of one embodiment for oscillating the thermoplastic polymer film prior to cutting.

FIG. 3 is a section of the mechanical oscillator illustrated in FIG. 2.

FIG. 4 is a cut-away end view of the die means of my invention.

FIG. 5 is a sectional view of the die means illustrated in FIG. 4. The sectional view illustrates the production of stripes of a single color.

FIG. 6 is also a sectional view of the die means illustated in FIG. 4. FIG. 6 also illustrates the production of stripes of a single color but which is different from that shown in FIG. 5.

FIG. 7 is a further section of the die means of FIG. 5. This section also illustrates the production of stripes of a single color but one which is different from those shown in FIGS. 5 and 6.

DESCRIPTION OF THE PREFERRED EMBODIMENT

Referring now to FIG. 1, it can be seen that thermoplastic polymer stock of varying colors can be introduced into melt screw extruders 1, 2, and 3. These extruders melt the polymer stock and force it at a predetermined pressure and temperature through tubing to die 7. Thermocouples and pressure sensitive switches are contained in monitoring devices 4, 5, and 6 to continuously provide information to extruders 1, 2, and 3 so that correct pressures and temperatures are maintained for each polymer stream. Positive displacement metering pumps can also be used to control the polymer flow to the die. The temperature of the polymer must be great enough to exceed the melting point and high enough to reduce the viscosity so it can be readily extruded. It should not be so high that degradation such as thermal degradation occurs. The temperature of each polymer stream is individually controlled so that its melt characteristics are very nearly like the melt characteristics of each other stream so that each stripe color will cover the same cross sectional area in the finished film. Since the addition of pigments or stabilizers changes the melt characteristics of any polymer, it may be necessary to maintain the streams at different temperatures in order to obtain comparable melt characteristics. Even when viscosity is reduced, pressures on the order of 1000 psi are required to effectively extrude the thermoplastic polymers.

Each colored polymer proceeds through die 7 via a separate conduit and is extruded from die 7 via its own series of outlets to form, in conjunction with the molten thermoplastic polymers of other colors, film 64. The series of outlets for each color are displaced so that the colors on film 64 appear in alternating sequence as stripes. Film 64 is taken up on casting roll 14, maintained at temperatures between 32° and 190°F. The thickness of the unoriented film can vary from about one mil to 10 or more mills, depending on the desired denier, and is controlled by the rate of polymer flow. Pressure means 9 presses the film 64 firmly against casting roll 14 so that no irregularities are introduced before the film 64 congeals. After leaving casting roll 14, film 64 travels over guide roll 57 and thence to heated roll 15. The edges of film 64 are trimmed by the pair of trim knives 8 mounted between guide roller 57 and heated roll 15. Trimming is both necessary and economical. Trimming serves to remove the thicker edges, to produce a uniform width for film 64 and to give a uniform color mix by controlling the width of the stripe of color along either edge of film 64. Scrap 13 from the trimmed film 64 is taken up by a vacuum within tube 11 generated by pump 10. The scrap is shredded by shredder 12 and recycled to the extruder of the appropriate color.

The film is drawn in the direction of the longitudinal axis by a series of hot and cold rolls. In the first stage, roll 15 is heated to reduce the viscosity sufficiently to permit drawing without melting the polymer. This temperature will range between about 200° and 300°F. Cold roll 16 rotates at peripheral speeds greater than that of heated roll 15 so that film 64 is effectively stretched between heated roll 15 and cold roll 16. Heated roll 17 turns at the same peripheral speed as cold roll 16. Heated roll 17 prepares the film for a second stage of drawing. The second stage of drawing is effected by the differential, peripheral roll speed between heated roll 17 and cold roll 18. Guide roll 19 travels at the same peripheral speed as cold roll 18 and serves to line film 64 up to be tested for thickness. Draw ratios for each stage are on the order of 1½ to 5. Overall draw ratios range from 5 to 15 and depend on the characteristics of the given thermoplastic polymer and the film thickness desired for the particular application. In other embodiments of the present invention, single stage drawing or multiple (more than two) stage drawing is utilized.

In the embodiment shown in FIG. 1, the thickness of the oriented film is continuously monitored to insure that no critical flaws have been introduced by extrusion and orientation. Film thickness also affects the denier of the yarn produced if a constant strip width is maintained. A beta source is mounted in housing 22 which is adapted to slide back and forth along bar 20. A beta detector is mounted in housing 23 which is similarly adapted to slide back and forth on bar 21. The movements of housing 22 and housing 23 are coordinated so that the beta signal received by the beta ray detector in housing 23 will be a function only of the thickness of the intervening absorbing material. Such beta ray thickness detectors are well known in the polymer film art. If flaws or thin streaks are detected, then the die can be adjusted or other corrective measures can be taken, if possible without stopping the production line.

After measurement of the thickness of the polymer film is completed, the film passes over expander roll 24 to prevent film 64 from wrinkling. Various types of expander rolls such as slot expander or Mt. Hope rolls are well known in the art. Film 64 then passes over guide roll 25 for introduction to the step of oscillation.

Nip roll 28 is positioned in opposition to roll 27 so that film 64 will pass between the two rollers. The circumferential drive of nip roll 28 is in the direction of flow of film 64. Nip roll 28 and roll 27 are disposed to oscillate in the plane of film 64 in a direction perpendicular to the direction of the longitudinal axis of film 64. Since film 64 is held firmly between the two rollers, an oscillation is introduced into the movement of film 64.

The oscillating film is introduced to a set of cutting rolls 29 and 31. Male knives 30 are affixed to the exterior of roll 29 and are adapted to fit into female grooves 32 on the surface of roll 31. As oscillating film 64 passes between rolls 29 and 31, it is cut into strips of uniform width. In another embodiment, rolls 29 and 31 were disposed to oscillate to introduce the random coloring, but it is preferable to oscillate the film rather than the cutting means, since the momentum of the moving cutting means is difficult to control. In the embodiment shown in FIG. 1, the uneven end strips 33, whose widths vary due to the oscillation of film 64 between cutting roller 29 and 31, are discarded. In another embodiment of my invention the uneven end strips are recycled for use elsewhere. After film 64 has been cut into strips of uniform width, the strips pass between nip roll 35 and roll 34. The drive of roll 34 is in the direction of motion of the strips. As a practical matter, the oscillation introduced by roll 27 and 28 will be damped by the grip of rolls 34 and 35 on these strips of film. Thus, the oscillations will occur between guide roll 25 and roll 34 and 35.

As the strips of film emerge from rolls 34 and 35, they pass over roll 36, which is placed above pan 37 containing an anti-static solution. Roll 36 continuously moves through the anti-static solution and continuously comes in contact with the strips of film thereby depositing on said strips a small quantity of the anti-static solution. Anti-static processing steps are well known in the synthetic textile art.

The parallel strips of oriented film are then fibrillated by any of the techniques known in the art to produce a fibrillated web. Fibrillation is a key step and various techniques have been developed to carry out fibrillation. In the embodiment illustrated in FIG. 1, a series of sharp teeth 39 are arranged in a helical pattern on drum 38 which is disposed above drum 40 having female helical grooves 41 on its surface. As the strips of film pass between drums 38 and 40, sharp teeth 39 fibrillate them. This fibrillation procedure is described in U.S. Pat. No. 3,496,259. The fibrillated film is then passed between nip roll 43 and roll 42 in preparation for the twisting and collecting of the individual strips.

Individual strips 45 are fed to individual sheeves 44 in preparation for twisting and collection. In the embodiment shown in FIG. 1, individual strands 45 are passed directly around sheeves 44 and 47 and introduced to a guide ring 48. An alternative procedure is to continually collect the strips on a suitable beam or reel for intermediate storage. This method of operation provides a useful means of separating the foregoing steps of the process of the present invention from the steps of twisting and collecting. Thus, upsets in either portion of the process do not affect the other portion. If this alternative procedure is followed, the individual strips are later removed from the intermediate storage beam or reel and then twisted and collected as shown in FIG. 1 for strip 45.

Twisting of the fibrillated polymer strips can be accomplished in many ways. The embodiment illustrated in FIG. 1 accomplishes twisting by threading the fibrilated strip of film through an off-center opening in rotating disc 53 mounted inside ring 52 which rotates about the axis on which take-up bobbin 50 is mounted. Disc 53 rotates within ring 52 at the same time ring 52 rotates about vertical axis 49 by means of I-bar 56. In order to take up the twisted film evenly on bobbin 50, bobbin 50 moves up and down on vertical axis 49. A portion of the twist is introduced prior to passage through the opening in ring 53 and part of the twist is introduced after passage through the hole.

The individual strip of film 45 which is magnified in FIG. 1A illustrates the fact that even though the alternating stripes of color 60, 61 and 62, oscillate along the length of the strip, each color covers an equal amount of surface area on each strip. A complete cycle of oscillation, illustrated by the portion of the strip between the two broken lines, results from one complete oscillation of nip roll 28 and roll 27 as described in the description of FIG. 1. The oscillation step produces an alternation of colors along both edges of every strip so that, overall, each color takes up an equal length along each edge. The equalization of color on the strip edges is as important as equilization of the color on the surface of each strip because the color on and near the edges can affect the appearance of the yarn as much as the colors on the inner portions of the strips. For yarn applications in which color constancy is not critical, the oscillation step can be eliminated, but it is essential for producing a product with a constant color.

FIG. 2 shows an embodiment of the oscillator means used to drive nip roll 28 and roll 27 in FIG. 1. Rolls 27 and 28 are mounted on slide means 80 and 81 which are disposed to slide back and forth on cylindrical members 85. Movement of slide means 80 and 81 on cylindrical members 85 is accomplished by a system of pivots about junctions 77, 78, & 88. Variable speed device drives off-center drive 72 by means of shaft 74, speed reducer means 73 and shaft 71. Off-center drive 72 causes member 70 to move up and down as well as sideways. The up and down motion of member 70 is translated to a horizontal motion in bar 76 by the pivots about junctions 77, 78, and 88. Pivot 88 is fixed in place due to the attachment of triangular member 79 to the conveyor frame at location 88. Pivot 77 moves up and down and sideways with a motion tied directly to that of member 70. Triangular member 79 rotates about fixed set screw means 84 at function 78. Set screw means 84 can be adjusted to fit at various locations on the end of shaft 82 in order to vary the amplitude of the horizontal oscillation which is transmitted to bar 76 and thence to slide means 80 and 81. Shaft 82 is permitted to move up and down in conjunction with the motion of member 70 by means of gimbal 89. Triangular piece 79, generally, translates the motion about the three pivot points 77, 78, and 88 and permits the up and down motion of member 70 to be translated into the horizontal motion of bar 76. Other oscillating systems could be employed, such as a pair of pneumatic or hydraulic plungers mounted on the opposite ends of rollers 27 and 28.

FIG. 3 is a section view of FIG. 2 showing the off-center drive, the pivots about junction 77, 78, and 88 and the rolls. Thus, drive shaft 78 is shown entering speed reducer 73 which translates the motion of drive shaft 74 into the motion of shaft 71 which turns off-center drive 72. Member 70 is shown to be connected to triangular members 79 at junction 77. Triangular member 79 functions as a connector between junction 77, junction 78, and junction 88 so that a pivotal translation of vertical-to-horizontal motion occurs.

As member 76 is mounted on slide means 80 and 81 at pivot 87, it is clear that a back and forth motion of fixed mounts 80 and 81 results from the back and forth action of member 76. The pressure of nip roll 28 against roll 27 is shown to be controlled by the action of pneumatic or hydraulic cylinder 83 against one end of rectangular member 84 which is mounted rotatably at point 86. As force is applied to the bottom end of rectangular member 84, the top portion of member 84, on which nip roll 28 is mounted, is pressed against roll 27. The passage of film 64 through oscillating rolls 27 and 28 is illustrated in phantom. Film 64 passes over expander roll 24, around idler roll 25, between rolls 27 and 28, and thence to cutting rolls 29 and 31.

In order to produce polymer film suitable for transformation into Moresque yarn, it is desirable to maintain uniform thickness for the film and it is critical that a strictly uniform color mix be obtained. It is also important that the bonding between the alternating colored polymers be strong enough to not rupture along their boundaries during orientation, cutting and fibrillation. These results are achieved by various features of the die means illustrated in FIGS. 4, 5, 6, and 7. FIG. 4 is a sectional end view of the die means, illustrating internal conduits 94, 95 and 96, and the extrusion surface formed by lip means 90 and 91 in relation to body 104. It is evident that FIGS. 5, 6, and 7 are sectional views of FIG. 4.

In FIG. 4 separate conduits 94, 95, and 96, which permit the passage of individually colored polymers, are shown to extend from the topmost portion of body 104 to insert means 106. After the individually colored molten polymers move through conduit means 94, 95 and 96, they pass through outlets 100, 101, and 102, respectively, configured within insert means 106. As is evident by reference to FIGS. 5, 6, and 7, outlets 102, 101 and 100 respectively, represent a series of outlets displaced in relation to each other for the purpose of producing a sequence of alternating colors which appear as stripes in the extruded thermoplastic polymer film. The sequence of colors can be altered by replacing insert means 106 with another insert means which has the outlets for the individual colors displaced in different spatial relation. A two-color film or a film with more than three colors can be produced by changing insert means 106. Since conduits 94, 95 and 96 are separate entities, it is possible to intermix thermoplastic polymers. For example, a nylon stripe might be alternated with a polypropylene stripe if the specification of the finished product required such a mixture, providing adequate bonding between non-polar polypropylene and polar nylon was obtained by modification of one or the other. Plugs 97 and 98 in conduits 94 and 95, respectively, permit the colored polymer in conduit 96 to be the exclusive color on the sides of the film.

Thermocouples 92 and 99 are implanted in the side of the die means in order to monitor continuously the internal temperature. The output of these thermocouples are used to control heater means which are placed around the exterior of the die means to maintain the die means at the best mean of the temperatures of the three individual polymer streams. In one embodiment of my invention, the die means is insulated to facilitate the maintenance of a constant mean temperature. The individual polymer stream temperatures, which are dependent upon the desired melt characteristic are controlled by the melt screw extruders. Fortunately, the stream temperatures remain nearly constant since heat transfer through polymers is negligible and polymer flow is laminar. The die means is maintained at the best mean of the three stream temperatures in order to minimize any variations in the temperatures of the individual streams.

As the molten polymer stock is forced from outlets 100, 101 and 102 in alternating color sequence, it is constrained by lip means formed by opposing members 90 and 91. The continuous flow of the polymer stock from outlets 100, 101 and 102, forms a continuous film. The film moves between opposing members 90 and 91 and is extruded externally at the bottom end of said opposing members. To insure adequate bonding between the molten polymer streams it is essential that a large pressure drop occur between the exit from insert means 106 and extrusion from opposing members 90 and 91. This pressure drop should be on the order of 500 - 1500 psi and preferably at the upper end of that range. The thickness of the extruded film is controlled by the spacing between opposing members 90 and 91. This spacing can be varied by means of screw 93 which forces the bottom member 91 against the bottom of member 90. Screw 93 is turned by means of head 103 and is maintained firmly in place by forcing threaded block 105 against the inside of the outside flanges of member 91. As shown previously in FIG. 1, the extruded film is quenched on cold roll 14 and then subjected to the remaining processing steps of this invention.

Outlets 100, 101 and 102, in insert means 106, as shown in FIGS. 7, 6 and 5, respectively, are not uniformly spaced apart. In each of the figures, the outside outlets are spaced farther apart than the inner outlets. This spacing differential is required in order to compensate for the tendency of the film to neck-in towards the center during casting and orientation. If the polymer film is considered as a three-dimensional object, then it can be understood that orientation in the longitudinal direction will tend to decrease the width of the film, as well as the thickness. The use of roll orientation gives a uniform as well as a minimum decrease in width. It is an empirical fact that the sides of the film tend to decrease in width more than the inner portions of the film, and this requires the outside stripes to be made wider than the inner stripes before orientation so that stripes along the outer edge, while originally larger, become equal to the size of the inner strips after orientation.

The shape of outlets 100, 101 and 102 is cylindrical. Cylindrical outlets produce a film having adequate bonding between the different colored stripes. Thus, it was not necessary to use a special configuration for the outlets. However, other outlet shapes may be useful and are contemplated for this invention. These include rectangular outlets, an outlet shaped from a series of concave sides, or an elliptical outlet.

From FIGS. 5, 6, and 7, the formation of the alternating sequence of colored stripes can be seen. The color in conduit 96 is forced through outlets 102 in insert means 106 to form the two sides of the film and every third stripe 60 within the film. The colored polymer within the conduit 95 is forced through outlets 101 in insert means 106 to form stripe 61 adjacent to the wide color band on the side and to form every third stripe 61 thereafter in the interior of the film. Similarly, the colored polymer in conduit 94 is forced through outlets 100 in insert means 106 to form the second stripe 62 from the wide color band on the side and every third stripe 62 thereafter in the interior of the film. The concept of this die means and insert means can be adapted to two, four, five or more colors. Sufficient conduit means need only be provided within body 104 and insert means 106 need only be configured to provide a sufficient series of outlets in spaced relation to each other in order to increase or decrease the number of colors. The number of stripes in each strip can also be varied to produce different yarn effects. For example, three stripes (one of each color) per strip produces a different effect than nine stripes (three of each color) per strip. The latter effect is more subtle.

Moresque yarns destined for the indoor-outdoor carpet market which are prepared from thermoplastic polymer film are specially formulated with one or more of the well-known stabilizers. For example, the polymers may contain additives such as U.V. stabilizers, plasticizers, anti-oxidants, heat stabilizers, die acceptors, pigments, dies, and the like. When pigments are used to color the thermoplastic polymers, they are chosen for their compatability with the polymer and their inherent resistance to ultraviolet radiation. The selection of stabilizers is generally well known in the thermoplastic polymer art.

EXAMPLES

1. Polypropylene pellets of three different colors were used as feedstock for the process of the present invention. Pellets of Color A were introduced to a melt extruder maintained at a temperature of 446°F. and a pressure of 400 psig. Color B was introduced to a melt extruder maintained at a temperature of 473°F. and a pressure of 1700 psig. Color C was introduced to a melt screw extruder maintained at a temperature of 452°F. and a temperature of 2100 psig. The molten polymers were then individually introduced to melt pumps. Color A was introduced to a pump whose discharge was maintained at a pressure of 1600 psig. Color B was introduced to a melt pump whose discharge was maintained at a pressure of 1500 psig. Color C was introduced to a melt pump whose discharge was maintained at a pressure of 1500 psig. The molten polymers under pressure were then introduced to a die means. Within the die means Color A was maintained at a temperature of 492°F., Color B was maintained at a temperature of 490°F. and Color C was maintained at a temperature of 489°F. The extruded film was taken up by a casting roll whose temperature was maintained at 64°F. Subsequently, the congealed film was stretched by a series of seven rolls. The speed of the first roll was 50 feet per minute and the speed of the seventh roll was 350 feet per minute. The temperatures of the seven rolls were, in sequence, 266°F., 276°F., 146°F., 284°F., 296°F., 82°F., and 56°F. The stretched film was then oscillated transverse to the longitudinal direction at an amplitude of 0.35 inches and at a frequency of 15 oscillations per minute. The width of the oriented film after being trimmed was 20 inches. The film was slit into strips of 0.7 inch widths, each of which had nine full stripes. The individual strips were then fibrillated and twisted to make Moresque yarn which was tufted into indoor-outdoor carpets with a Moresque appearance. These carpets possessed comparable aesthetic qualities to the better Moresque yarn carpets made by the traditional process of twisting individual yarns together and then tufting them into carpets.

2. Polypropylene pellets of three different colors were used as feedstock in the process of the present invention. Color A was introduced to a melt screw extruder maintained at a temperature of 432°F. and a pressure of 2000 psig. Color B was introduced to a melt screw extruder maintained at a temperature of 443°F. and a pressure of 1300 psig. Color C was introduced to a melt screw extruder maintained at a temperature of 443°F. and a pressure of 2000 psig. The molten polymers were then introduced directly to a die means. The die means was maintained at a constant temperature of 500°F. The width of the die means was 8 inches. Upon extrusion from the die means, the film was taken up by a casting roll maintained at a temperature of 56°F. The film was then stretched by a series of five orientation rolls. The peripheral speed of the first roll was 16.4 feet per minute and the peripheral speed of the last roll was 114 feet per minute. The temperatures of the five rolls, in sequence, were: 270°F., 250°F., 75°F., 280°F., and 75°F. The film was then oscillated slightly transverse to the longitudinal direction. The oscillating film was cut into strips having 0.7-inch widths. Each strip contained nine stripes. The strips were then fibrillated, twisted, and collected to form Moresque yarn. The Moresque yarn was then tufted into indoor-outdoor carpets having the aesthetic qualities of the better Moresque yarn carpets made by the traditional process of twisting individual yarns together and then tufting them into carpets.

Additional tests were run for which complete data are not available. In one test a two-color film was produced by specially machining a new insert means 106, as shown in FIGS. 4, 5, 6 and 7. In another test, insert means 106 was altered so that individual strips, as shown in FIG. 1A, contains three stripes. In an additional test, insert means 106 was machined so that each individual strip had 12 stripes per 0.7 inches. It was noted that the larger the number of stripes per strip, the less pronounced the Moresque effect. In a further test, insert means 106 was machined so that successive stripes had dissimilar widths. The finished product presented a mottled appearance. In many of the tests, the yarn was tufted into carpets. It was evident that a tremendous variety of finished products could be obtained by varying the number of colors and the configuration of insert means 106.

Although a preferred embodiment of the present invention has been shown and described and several examples given, many modifications thereof may be made by a person skilled in the art without departing from the spirit of the invention, and it is desired to protect, by Letters Patent, all of the inventions falling within the scope of the following claims.

What is claimed is:

1. Apparatus for forming yarn from thermoplastic polymers comprising die means for extruding a continuous sheet of multicolored film from thermoplastic polymer stock, orientation means for orienting said continuous sheet of multicolored film in the longitudinal direction, cutting means for cutting said continuous sheet of multicolored film along the longitudinal direction to form strips of film of fixed widths, oscillating means for oscillating said continuous sheet of multicolored film transverse to the longitudinal direction upstream of said cutting means, means for fibrillating said strips of film, means for twisting said fibrillated strips of film to form yarn and means for collecting said yarn.

2. Apparatus for forming yarn from thermoplastic polymers comprising:
    die means for extruding a continuous sheet of multicolored film from thermoplastic polymer stock,
    said die means being constructed and arranged to extrude a said sheet of film having a plurality of longitudinally extending stripes of respectively different colored polymers bonded together in edge-to-edge relationship,
    orientation means for orienting said continuous sheet of multicolored film in the longitudinal direction,
    oscillating means for oscillating said sheet transversely to said longitudinal direction,
    cutting means for cutting the oscillating said continuous sheet along the longitudinal direction to form strips of film of a width containing film portions of at least two of said respectively different colored polymers bonded together in edge-to-edge relationship,
    means for fibrillating said strips of film,
    means for twisting said fibrillated strips of film to form yarn, and
    means for collecting said yarn.

* * * * *